(12) United States Patent
Weber

(10) Patent No.: US 10,009,397 B2
(45) Date of Patent: Jun. 26, 2018

(54) OPTIMIZING TELECONFERENCING USING TRANSPARENT RELAYS

(71) Applicant: Blue Jeans Network, Mountain View, CA (US)

(72) Inventor: Emmanuel Weber, San Jose, CA (US)

(73) Assignee: BLUE JEANS NETWORK, INC., Mountain View, CA (US)

(*) Notice: Subject to any disclaimer, the term of this patent is extended or adjusted under 35 U.S.C. 154(b) by 204 days.

(21) Appl. No.: 14/881,397

(22) Filed: Oct. 13, 2015

(65) Prior Publication Data
US 2016/0105476 A1 Apr. 14, 2016

Related U.S. Application Data

(60) Provisional application No. 62/063,376, filed on Oct. 13, 2014.

(51) Int. Cl.
| | |
|---|---|
| *H04B 7/14* | (2006.01) |
| *H04N 7/15* | (2006.01) |
| *H04L 29/06* | (2006.01) |
| *H04W 4/021* | (2018.01) |
| *H04W 88/04* | (2009.01) |
| *H04L 29/08* | (2006.01) |
| *H04L 1/00* | (2006.01) |
| *H04L 1/08* | (2006.01) |
| *H04L 1/18* | (2006.01) |

(52) U.S. Cl.
CPC ........ *H04L 65/4076* (2013.01); *H04L 65/608* (2013.01); *H04L 67/10* (2013.01); *H04L 67/18* (2013.01); *H04L 69/16* (2013.01); *H04W 4/021* (2013.01); *H04W 88/04* (2013.01); *H04L 1/004* (2013.01); *H04L 1/08* (2013.01); *H04L 1/18* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 7,017,102 B1* | 3/2006 | Kristensson | H04L 1/0041 370/216 |
| 8,482,593 B2 | 7/2013 | Periyannan et al. | |
| 8,514,263 B2 | 8/2013 | Periyannan et al. | |
| 8,875,031 B2 | 10/2014 | Periyannan et al. | |
| 8,885,013 B2 | 11/2014 | Periyannan et al. | |
| 9,035,997 B2 | 5/2015 | Periyannan et al. | |
| 9,041,765 B2 | 5/2015 | Periyannan et al. | |
| 9,124,757 B2 | 9/2015 | Weber | |
| 9,143,729 B2 | 9/2015 | Anand et al. | |
| 9,232,191 B2 | 1/2016 | Periyannan et al. | |
| 2003/0074443 A1* | 4/2003 | Melaku | H04L 12/5692 709/224 |
| 2004/0172656 A1* | 9/2004 | Kim | H04L 29/06027 725/109 |

(Continued)

*Primary Examiner* — Edan Orgad
*Assistant Examiner* — Sithu Ko
(74) *Attorney, Agent, or Firm* — Ascenda Law Group, PC

(57) ABSTRACT

Disclosed herein are systems, methods, and machine readable media for implementing a teleconferencing system using transparent relays. The transparent relays may be used to push network probing and certain functionalities as close as possible to each teleconferencing endpoint in order to improve overall video performance.

20 Claims, 9 Drawing Sheets

(56) References Cited

U.S. PATENT DOCUMENTS

| | | | | |
|---|---|---|---|---|
| 2011/0134909 A1* | 6/2011 | Huang | ................. | H04L 1/0009 370/352 |
| 2012/0218887 A1* | 8/2012 | Khilnani | ............ | H04L 43/0876 370/230 |
| 2014/0267577 A1* | 9/2014 | Weber | ................ | H04L 12/1822 348/14.09 |

* cited by examiner

OPTIMIZING TELECONFERENCING USING TRANSPARENT RELAYS

CROSS-REFERENCE TO RELATED APPLICATIONS

This application claims the benefit of U.S. Provisional Application No. 62/063,376, filed Oct. 13, 2014, which is incorporated by reference in its entirety.

FIELD OF THE INVENTION

The present invention relates to apparatuses, systems, computer readable media, and methods for the provision of teleconference services.

BACKGROUND

Video conferencing services can be degraded by typical network problems as well as problems related to the "last mile." Typical network problems include limited bandwidth, packet loss, jitter, out of order packets, duplicate packets, and congestion. Problems related to the last mile include congested Wi-Fi, and restricted firewalls that may impede high quality service. These problems not an exhaustive list, but provide examples of some of the problems that affect overall video quality. In the teleconferencing context, these problems can be exacerbated when the network is evaluated from a centralized location, because, for example, the centralized location may be geographically distant from the source of the issue, leading to delays and sometimes masking of the network problems.

There is a need for teleconferencing systems that are capable of assessing and responding to problems in network quality in a fast and efficient manner. Disclosed herein are embodiments of an invention that address those needs.

BRIEF DESCRIPTION OF THE DRAWINGS

The above and other aspects and advantages of the invention will become more apparent upon consideration of the following detailed description, taken in conjunction with the accompanying drawings, in which like reference characters refer to like parts throughout, and in which.

DETAILED DESCRIPTION

Described herein are systems and methods for providing a teleconferencing service using transparent relays. Various approaches are described, including integrating transparent relays into a private controlled network, a hosted solution, and/or a cloud solution, especially over the internet.

As used herein, a teleconferencing system may include video conferencing. As used herein, a transparent relay refers to a bidirectional relay for media streams that is positioned between at least one endpoint and a data center, such that the relay is geographically close to the at least one endpoint and actively manages bidirectional data transfer between the data center and the endpoints. For example, the relay may be geographically close to an endpoint when it is significantly closer to the endpoint when compared to a data center. Transparent relays are further described below with respect to FIG. 5 and in the context of the figures describing systems including transparent relays in this specification.

Figure 1:
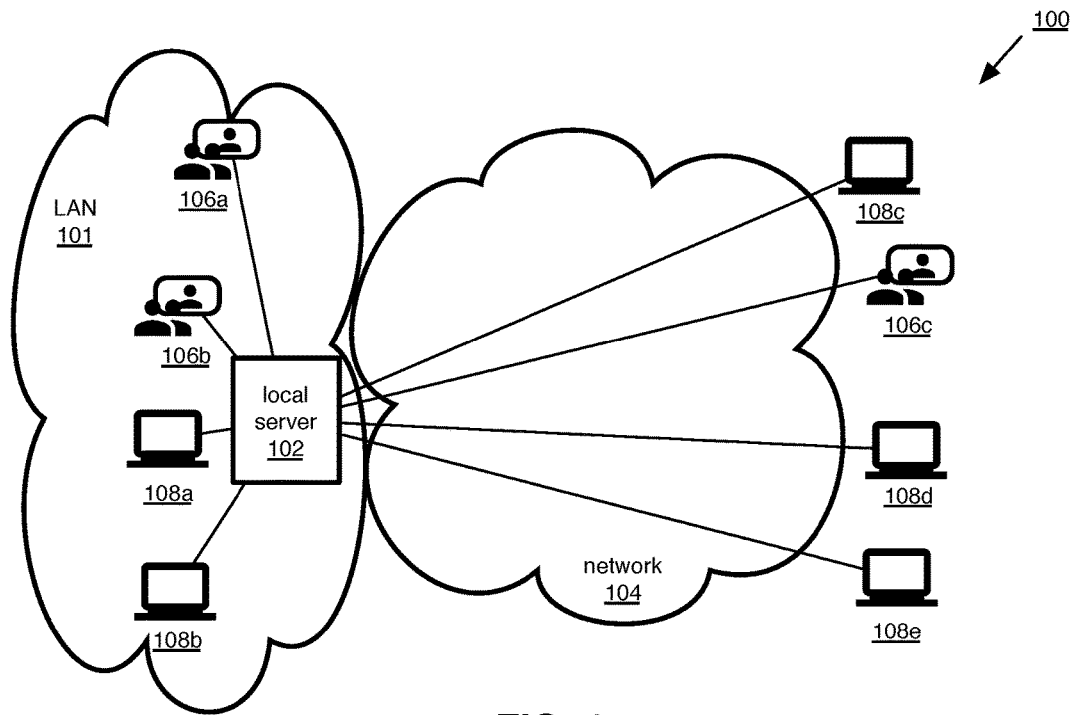
FIG. 1 is a diagram of a prior art system for providing a teleconferencing service.

FIG. 1 is an exemplary prior art system 100 including a private, controlled local area network (LAN) 101. A private controlled network is fully controlled by an enterprise IT (Information Technology) department (e.g., an information technology group of a company). An enterprise may be an organization, a corporation, a company, a communications service provider, a customer or a user of a communications service provider, a customer or user of the video conference system, a population of a city or country, and/or any other identifiable group of users with access to a private network. System 100 may include at least two categories of teleconferencing endpoints 502: room systems 106 and other types of endpoints 108. A room system 106 may be a videoconferencing room system running the H.323 or SIP protocols. Other types of endpoints 108 may include personal computers, laptops, tablets, phones, smartphones and other types of devices running standards-based communication protocols such as H.323, SIP, or XMPP, or proprietary communication protocols such as Skype, Google Talk, and Apple FaceTime. Private network/LAN 101 may include a local server 102 that may be on the same local area network as the local endpoints (e.g., endpoints 106a, 106b, 108a, and 108b in FIG. 1). Network 104 represents a wide area network such as the internet.

It is possible to implement several types of quality of service techniques (including forward error correction and packet retransmission) for the private network in such a way that most of the problems (e.g., limited bandwidth, packet loss, jitter, out of order packets, duplicate packets, congestion, and last mile issues) mentioned previously are controlled and the video quality is optimized. The main drawback of this type of deployment is it may not work well for interactions with users outside of the controlled network 101 (e.g., endpoints 108c, d, and e, and 106c in FIG. 1). For these users, it may be difficult to set up a call and there are overall quality concerns. As you can see on the left side of FIG. 1, the controlled network 101 is deployed outside of the network 104. It is completely deployed on the enterprise network. All the calls within private network 101 are private, but other parties trying to reach it via network 104 (e.g. the internet) are penalized, if they can connect at all.

Figure 2:
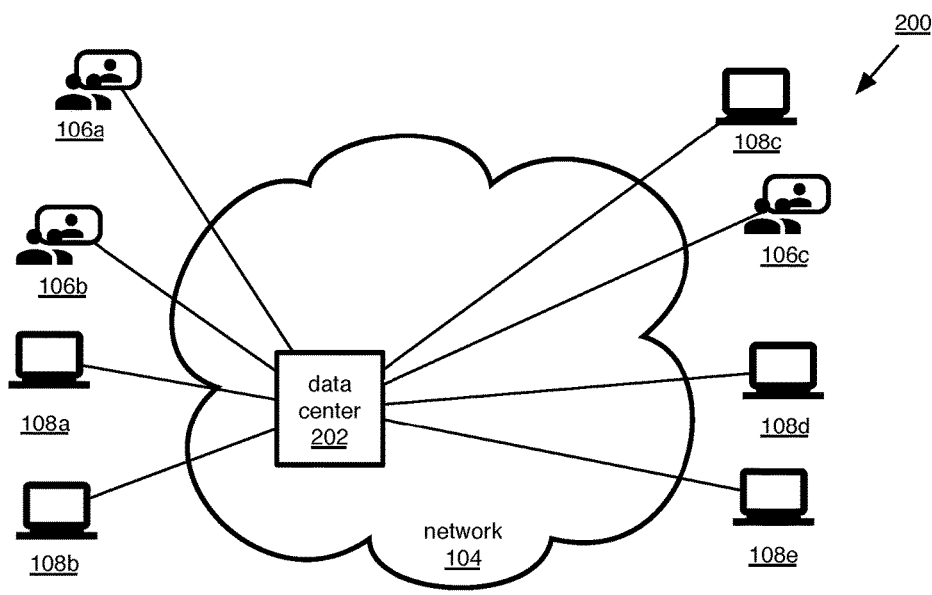
FIG. 2 is a diagram of a prior art system for providing a teleconferencing service.

FIG. 2 is a diagram of a prior art system 200 for providing a teleconferencing service using a hosted deployment. There is a teleconferencing service deployed via a central location (e.g., at data center 202) and all the different parties communicate with that location. In certain embodiments, all endpoints using system 200 must use the same software to participate in a teleconference. Endpoints as shown in FIG. 1 within the enterprise network 101 (e.g., endpoints 106a, 106b, 108a, and 108b) now must access this new data center 202 outside of the company network, along with all other endpoints (e.g., endpoints 108c, d, and e, and 106c in FIG. 2).

In a hosted deployment, enterprises use conferencing software that is deployed outside of the company network, often for cost reasons. The software is maintained by one or more third parties and not by local IT (e.g., IT department of an enterprise). The solution is usually not designed to handle internet congestion or difficulties with a network, often because a system such as system 200 uses the same software that was used in the company network (e.g., enterprise network 101). The hosted deployment approach may be associated with multiple problems relating to video delivery: for example, the benefit of a locally controlled environment is lost, so it is not possible to implement some of the quality of service techniques that are applicable to a private network. Thus the quality of the teleconferencing service may be degraded, and hosted deployment does not completely solve the problem of difficulties with connecting an external party to a private network.

Figure 3:
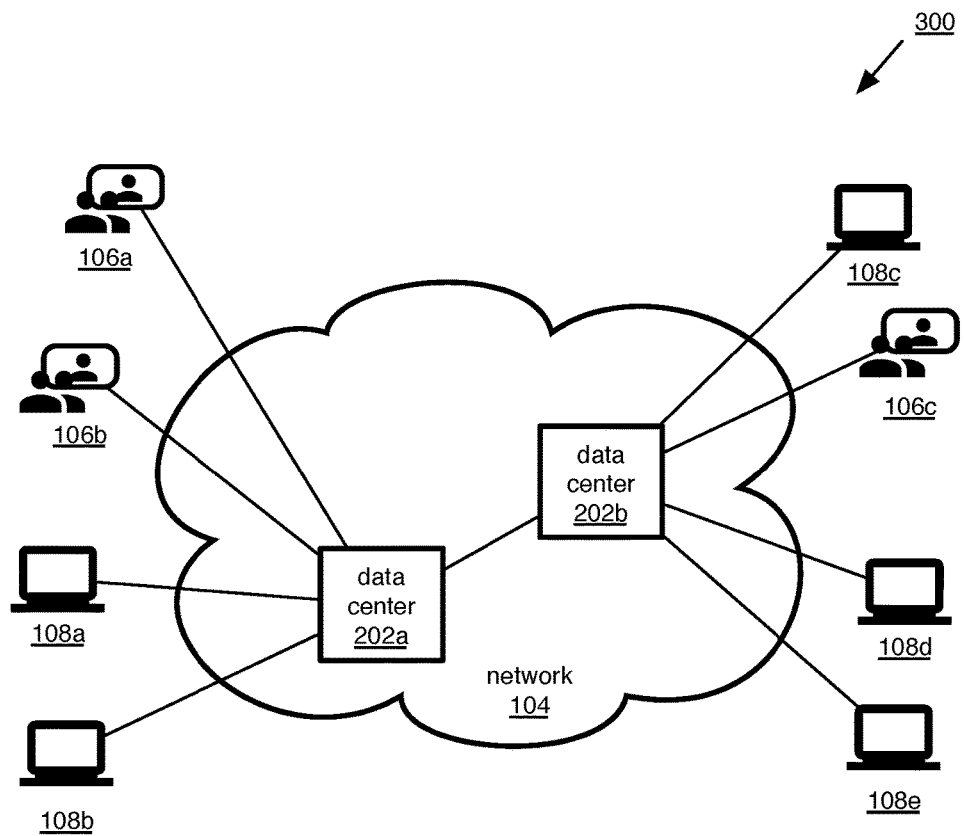
FIG. 3 is a diagram of a prior art system for providing a teleconferencing service.

FIG. 3 is a diagram of a prior art system 300 for providing a cloud-deployed teleconferencing service. Here, two data centers 202 are depicted and the media (e.g., video and audio) can be routed between them. The different endpoints 106 and 108 can communicate with the data center 202 that is geographically closest to them, which can improve the overall video quality. Cloud-deployed solutions are usually associated with dedicated software that has been designed to deal with internet traffic, so the overall user experience has improved. The software can be distributed geographically to get closer to endpoints and the approach provides for multiple data center deployed with the traffic routed between the data centers (e.g., two depicted between the endpoints) and this can improve the overall video quality.

Figure 4:
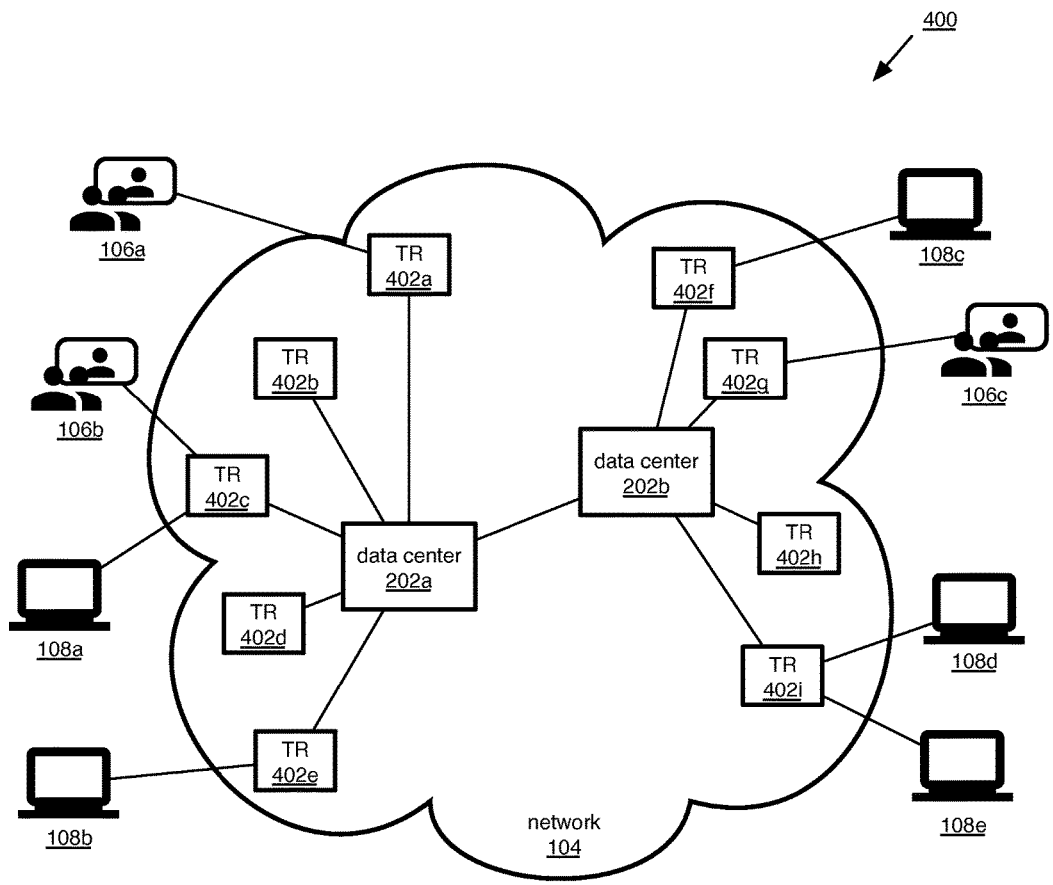
FIG. 4 is a diagram showing an exemplary system for providing a teleconferencing service, in accordance with some embodiments of the invention.

FIG. 4 is a diagram showing an exemplary system 400 for providing an improved teleconferencing service using transparent relays 402. Exemplary system 400 is based on a cloud-based architecture with transparent relays. This approach seeks to push some of the functionality as close as possible to each endpoint in order to improve the overall video performance. This can be accomplished with the use of a "transparent relay" 402 located near to one or more endpoint that funnels Real-time Transport Protocol (RTP) and RTP Control Protocol (RTCP) streams. A transparent relay 402 is "transparent" in that the endpoints are not aware that they have been instructed to send and receive media via an IP address associated with a relay 402 rather than an address associated with a centralized data center such as 202. In certain embodiments, the transparent relay should be located as close as possible to a respective endpoint 106 or 108. For example, many transparent relays 402 may be deployed across the globe. A shorter round-trip signal travel time between the transparent relay and the endpoint leads to better performance. FIG. 4 shows a multitude of transparent relays 402 that have been deployed across network 104. While the transparent relay 402 approach may have some similarities to a content delivery network (CDN) in that a CDN seeks to use a system of distributed servers to deliver content to users based on the geographic location of the user, a system using a transparent relay is different for at least two reasons: (1) in contrast to a transparent relay, a CDN has no mechanism for actively facilitating data transfer, and (2) a CDN only concerns one-way delivery in contrast to the two-way data transfer facilitated by a transparent relay 402. A transparent relay 402 may incorporate a Media Aware Network Element (MANE) type device. A MANE-type device is a network element, such as a middlebox or application layer gateway that is capable of parsing certain aspects of the RTP payload headers or the RTP payload and reacting to the contents.

As a result of the transparent relays 402 being geographically located closer to endpoints 502 and incorporating active facilitation of data transfer, there are several benefits to integrating transparent relays into a teleconferencing system: First, use of transparent relays can enable several error resilience schemes. Second, transparent relays can enable better bandwidth prediction—for example, they may enable earlier congestion detection. Third, they may provide better network control (e.g., identifying and avoiding a congested peering point). Fourth, transparent relays can provide improved network analytics. Each of these features is explained in more detail below.

Figure 5:
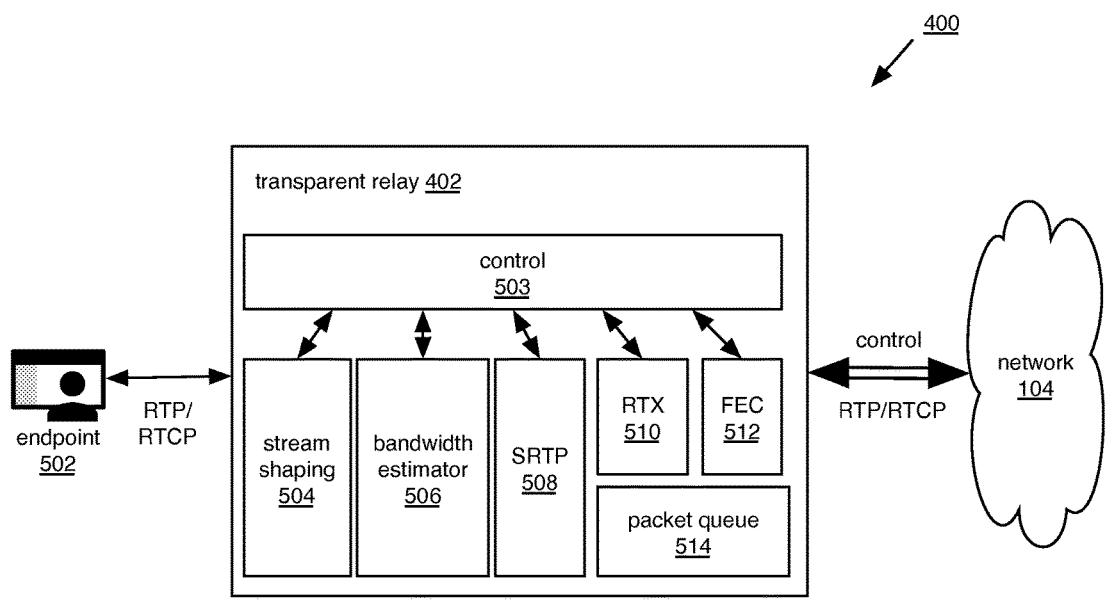
FIG. 5 shows a block diagram of an exemplary transparent relay, in accordance with some embodiments of the invention.

FIG. 5 provides a high level breakdown of an exemplary transparent relay 402 in communication with an endpoint 502 and the rest of system 400 via network 104. The transparent relay is largely concerned with RTP/RTCP traffic, which is funneled between the endpoint and the rest of system 400 via network 104. In certain embodiments, and as shown in FIG. 5, there is no control connection between the endpoint 502 and the transparent relay that is established. The control connection between the transparent relay 402 and the network 104/rest of system 400 may be used to receive configuration information such as payload information, certain system analytics, encryption keys, and the like. Some lightweight processing may be performed by a transparent relay (e.g., Forward Error Connection (FEC) and Secure RTP (SRTP) for encryption). The network path between the transparent relay 402 and the rest of the cloud infrastructure may be managed by the cloud operator. In certain embodiments a transparent relay 402 is a device running software components 503-514. In certain embodiments, transparent relay 402 is comprised of one or more devices dedicated to each of components 503-514, or combinations thereof. A transparent relay 402 includes at least a control component 503, a bandwidth probe component 506 and one or more error resilience components (e.g., retransmission component 510, and/or an FEC component 512). Control component 503 implements the overall logic performed by the transparent relay 402—e.g., it may determine whether to use a retransmission (RTX) or FEC or both based on bandwidth and latency measurements at the transparent relay 402. Stream shaping component 504 may be used to intelligently modulate the size of the data stream by, for example, dropping some data from the stream (e.g., sending every other frame) based on endpoint 502's capabilities. Bandwidth probe 506 may assess network quality based on the network characteristics which are aspects of the network including the type of network (e.g., Ethernet, Wi-Fi, cellular network), the presence of a firewall, and measurements such as packet loss, latency, and jitter. Encryption/decryption module 508 may handle SRTP or other encryption protocols for media being relayed in either direction (e.g., toward endpoint 502 or network 104). Retransmission component 510 may support handling resending packets when missing data is identified. Control component 503 may be more likely to permit/use retransmission where network latency is low. FEC component 512 may be used to add redundancy to a data stream—for example, control component 503 may cause relay 402 to send some multiple of each data packet when the bandwidth is high. Packet queue 514 may provide a history of all relayed data packets.

Error resilience schemes facilitated by transparent relays may include retransmission, forward error correction, and stream shaping. A retransmission is facilitated even in a globally distributed teleconference because the transparent relay is geographically close to the endpoint, so the latency that would otherwise degrade the effectiveness of retransmission is minimized. Forward error correction can be generated relatively cheaply at the edge of the teleconference network by the transparent relay, thus adding robustness to the media stream. Stream shaping can be used with scalable media to better tune the teleconference data stream to the capabilities of the endpoint device. The relay's control component 503 controls which combinations of the error resilience schemes are used in response to the network characteristics and the type of endpoint device 502.

Bandwidth prediction is facilitated by transparent relays because the relay 402 is located close to the endpoint 502, so there is less network unknown between the endpoint and the relay (e.g., there are fewer hubs that could hide some of the network characteristics), and because the transparent relay is capable of analyzing network characteristics. As a result, bandwidth estimation using indirect methods such as delay detection may be more accurate, and can react more quickly to any congestion. Bandwidth probing may also be more reliable because there is less network unknown between the endpoints and the relay.

Network control may be facilitated by transparent relays. For example, a cloud provider may manage the network infrastructure between the relay 402 and the rest of the network used by the teleconference service (e.g., network 104), so the provider can take steps to improve the network passing between the relay and the rest of the service. This is something that a third party company would have difficulty doing—by incorporating a transparent relay as close as possible to the endpoints 502 there is much less network that is not under the control of the cloud provider. In certain embodiments, the transparent relay 402 can be deployed on the customer premises. This can provide almost the same reliability as an on-premises solution such as a local LAN. In some embodiments, endpoint connections that initially use transmission control protocol (TCP) or HTTPS to go through restricted firewall may be terminated earlier (i.e., at the relay 402), which greatly improves overall TCP performance.

Transparent relays may facilitate improved network analytics because the relays 402 are deployed in many locations and can be used to provide analytics of the quality of the network; these analytics can be used by the cloud operator to adapt its network infrastructure dynamically and improve overall video delivery. For example, based on the global analytics provided by the relays, the cloud operator may choose an alternate provider or network path to serve some areas, or route calls to a different geography.

With this approach, bidirectional real-time communication, such as RTP bidirectional communication and user datagram protocol (UDP)-based media may be used. For example, functionality to improve performance may be provided in the transparent relay that is UDP based (e.g., RTX).

With the relays 402, media handling logic is pushed to the edge of the network. Control may be handled between a cloud data center 202 and the relay 402 as opposed to control handled between the cloud data center 202 and the endpoint 502. In the absence of transparent relays, measurements of network characteristics and quality are performed at data center 202 (e.g., a POP such as 602), rather than close to the endpoints 502. Thus the improvements in error resilience, bandwidth prediction, and network control due to the function and location of the relays is lost, and logic for handling media would be inside this data center.

By way of example, if the transparent relay was not in place, there may be two lines between the endpoint 502 and the cloud 104: a control connection, and media traffic (e.g., RTP/RTCP connection). Transparent relays have been inserted in the media path and not inserted in the control path. The endpoint 502 functions as if it is communicating with the cloud (e.g., cloud data center 202), but it is actually communicating with these transparent relays 402. Essentially, rather than each of the endpoints 502 communicating with some centralized data center, they are communicating with a transparent relay 402. The endpoint may not be aware that it is communicating with the transparent relays. The endpoint is instructed by the main center cloud control (e.g., a Point of Presence (POP) including a Multipoint Control Unit (MCU)) to send its media to a certain place, in this case, a transparent relay that is in close proximity to the endpoint. In effect, the endpoint is instructed to send and receive media from a certain IP address, which happens to be this transparent relay. The solution is transparent in the sense that the endpoint may communicate with the relay just as done with the cloud provider data center without the knowledge that the endpoint is actually communicating with a relay at the edge of the network. With the transparent relays at the edge of the network and closer to the endpoint, there are more techniques that can be applied to provide overall better quality of experience.

Locating a transparent relay 402 in close proximity to an endpoint 502 may include positioning the relay and endpoint in the same geographic region, in the same metropolitan area, on the same business premises, or in the same country, or less than 50 or 100 miles apart.

A teleconference system configured in accordance with some embodiments of the present invention may provide a user interface for presentation of one or more received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013); U.S. patent application Ser. No. 13/105,684, entitled "Systems and Methods for Real-time Multimedia Communications Across Multiple Standards and Proprietary Devices,"

filed on May 11, 2011 (issued as U.S. Pat. No. 9,035,997 on May 19, 2015); U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013); U.S. patent application Ser. No. 13/955,646, entitled "Systems and Methods for Scalable Distributed Global Infrastructure for Real-time Multimedia Communication," filed on Jul. 31, 2013 (issued as U.S. Pat. No. 9,232,191 on Jan. 5, 2016); U.S. patent application Ser. No. 13/105,704, entitled "Systems and Methods for Security and Privacy Controls for Videoconferencing," filed on May 11, 2011 (issued as U.S. Pat. No. 9,041,765 on May 26, 2015); U.S. patent application Ser. No. 13/105,716, entitled "Systems and Methods for Shared Multimedia Experiences in Virtual Videoconference Rooms," filed on May 11, 2011 (issued as U.S. Pat. No. 8,875,031 on Oct. 28, 2014); U.S. patent application Ser. No. 13/105,719, entitled "Systems and Methods for Novel Interactions with Participants in Videoconference Meetings," filed on May 11, 2011 (issued as U.S. Pat. No. 8,885,013 on Nov. 11, 2014); U.S. patent application Ser. No. 13/105,723, entitled "Systems and Methods for Real-time Virtual-reality Immersive Multimedia Communications," filed on May 11, 2011 (issued as U.S. Pat. No. 9,143,729 on Sep. 22, 2015); and U.S. patent application Ser. No. 13/251,913, entitled "Systems and Methods for Error Resilient Scheme for Low Latency H.264 Video Coding," filed on Oct. 3, 2011 (issued as U.S. Pat. No. 9,124,757 on Sep. 1, 2015), each incorporated herein by reference in its respective entirety.

The video conference system is described in more detail with reference to FIGS. 6 and 7, and, as illustrated, may support a variety of video conferencing feeds of audio, video, audio and video, and/or other media data streams from video conferencing participant endpoints to present a video conference. Endpoints 502 may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

Figure 6:
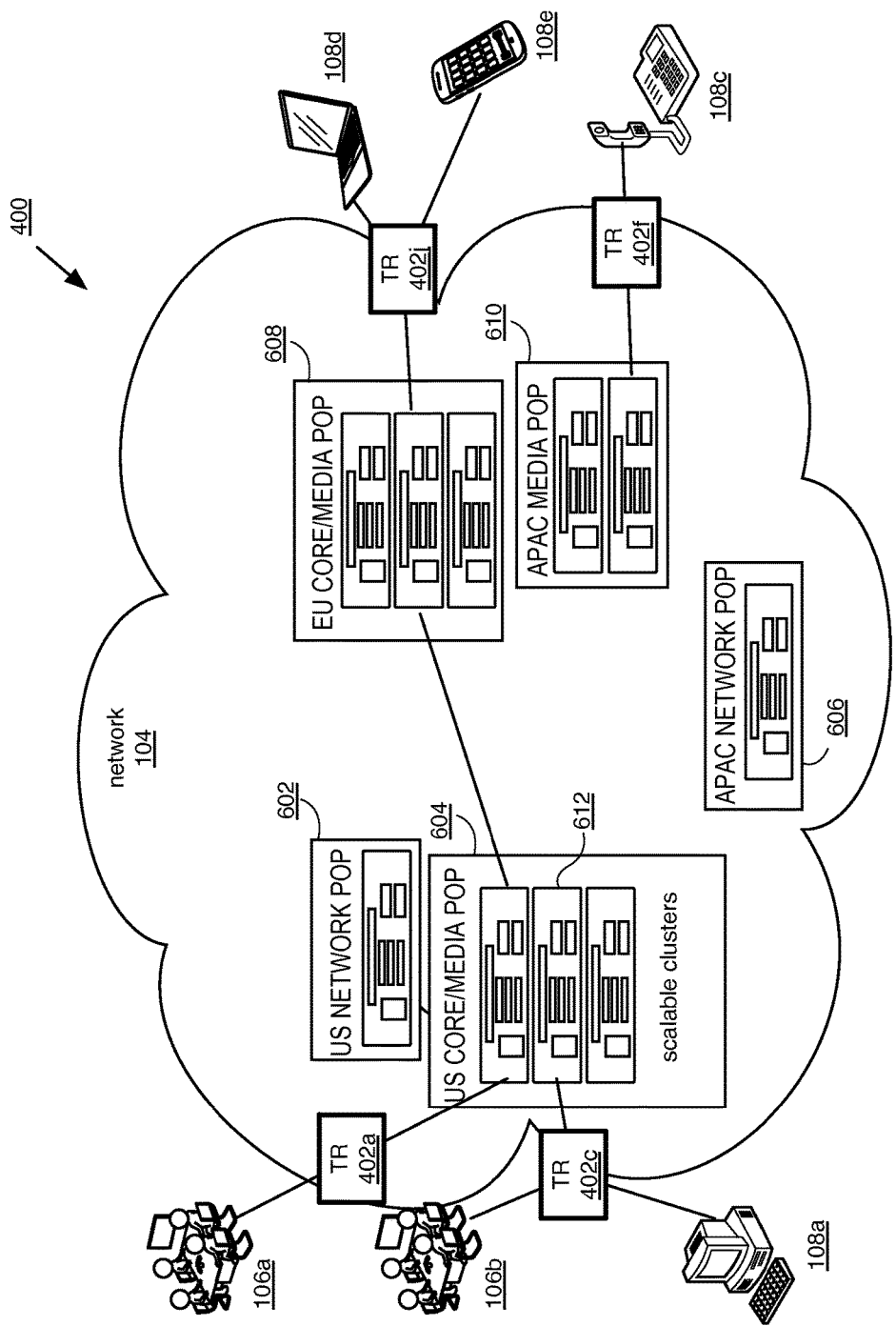
FIG. 6 is a diagram of an exemplary system for providing a teleconferencing service including points of presence, in accordance with some embodiments of the invention.

FIG. 6 is a diagram of an exemplary system 400 for providing a teleconferencing service including points of presence (602, 604, 606, 608, 610). For example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants.

As shown in FIG. 6, to support the operations of video conferencing, one or more media processing nodes (known in the industry as a Multipoint Control Unit (MCU)) (e.g., nodes within POPs 602, 604, 606, 608, and 610) may be used to process and compose video conference feeds from various endpoints 502 (e.g., endpoints 106 and 108) including creating a composite of data streams received from the disparate endpoints. A geographically distributed architecture and/or simply a distributed architecture may be implemented to practice the invention. In one example, system 400 has the media processing nodes distributed around the globe in POPs (e.g., United States (US) Network POP 602, US Core Media POP 604, Asia Pacific (APAC) Media POP 610, APAC Network POP 606, and European Union (EU) Core Media POP 608) at data centers (e.g., third party data centers) to process video conference feeds coming from video conference endpoints having different communication protocols and/or using different client applications from communication service providers. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP) that can handle the processing for the conference so as to allow them to minimize their latency.

Figure 7:
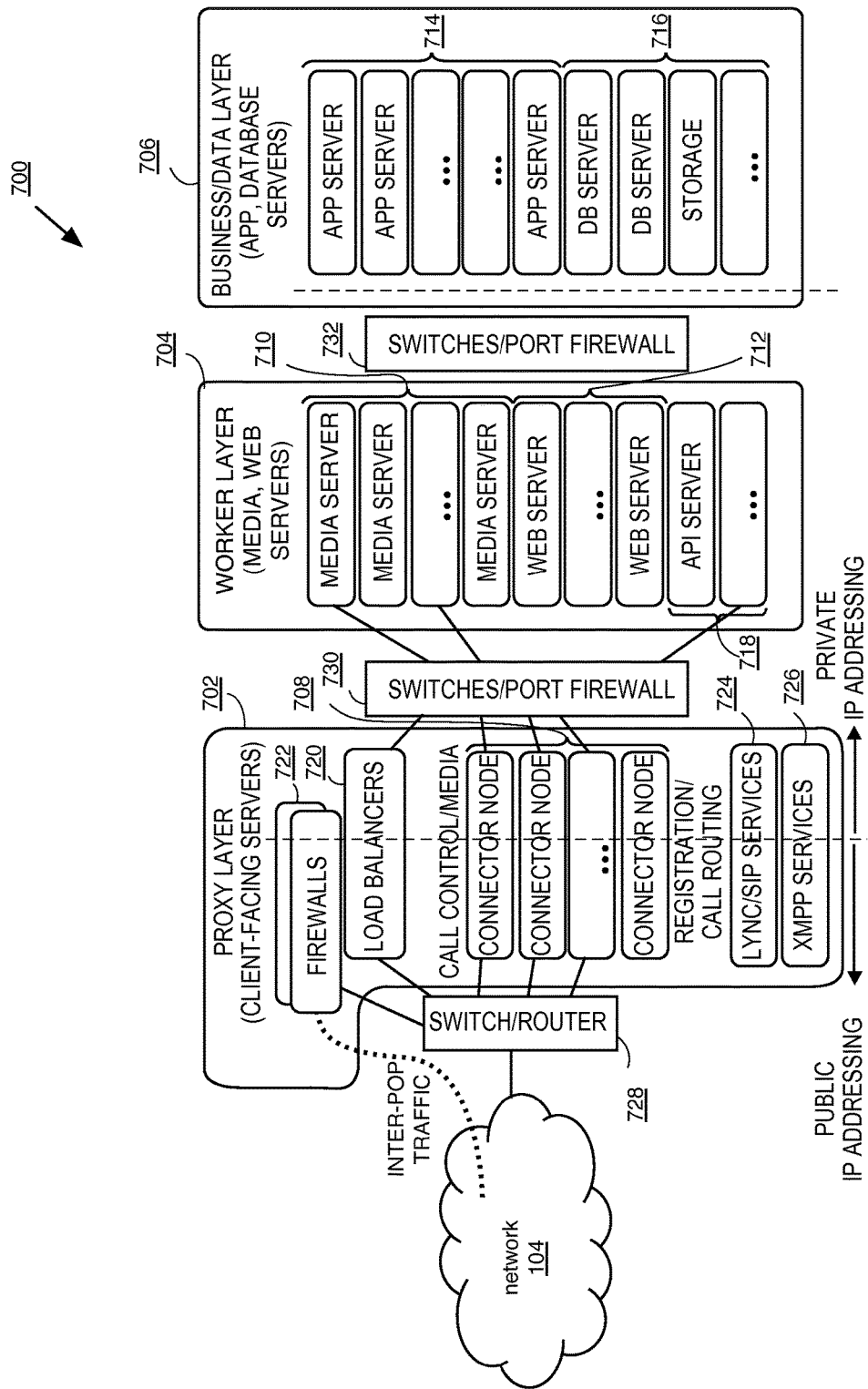
FIG. 7 is a diagram of an exemplary point of presence connected to a network, in accordance with some embodiments of the invention.

FIG. 7 is a diagram of an exemplary POP connected to a network. FIG. 7 depicts an exemplary scalable POP Media Processing Node Architecture 700 (e.g., architecture for POPs 602, 604, 606, 608, and 610) accessible over a network 104 with a Proxy Layer 702, a Worker Layer 704, and a Business/Data Layer 706. Some of the components/elements of the POP architecture 700, include but are not limited to, the following: load balancers 720, firewalls 722, media servers collectively 710 for processing data streams (e.g., transcoding, compositing, mixing and/or echo cancellation among H.26x, G.7xx, and SILK), protocol connector nodes collectively 708 for handling call and/or media processing control for endpoints of video conference (e.g., for H.323, Skype, SIP, XMPP, and NAT traversal), servers for handling particular communication services or protocols (e.g., LYNC, SIP services 724, and XMPP services 726), web servers collectively 712, application programming interface (API) servers 718, data storage collectively 716 (e.g., database (DB) servers and other storage), and applications servers collectively 714 for supporting web applications (e.g., for providing functionality to the user, such as conference control, screen and presentation sharing, chat, etc.). The components may be distributed across the nodes and/or POPs of the system 400 for enabling real-time or nearly real-time communication. Components may be connected on a network and can communicate over networks utilizing switches and routers as shown with 728, 730, and 732.

Each of the protocol connector nodes 708 in the Proxy Layer 702 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 710 of the Worker Layer 704, such operation of the media servers 710 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 702 with a protocol connector node 708.

Figure 8:
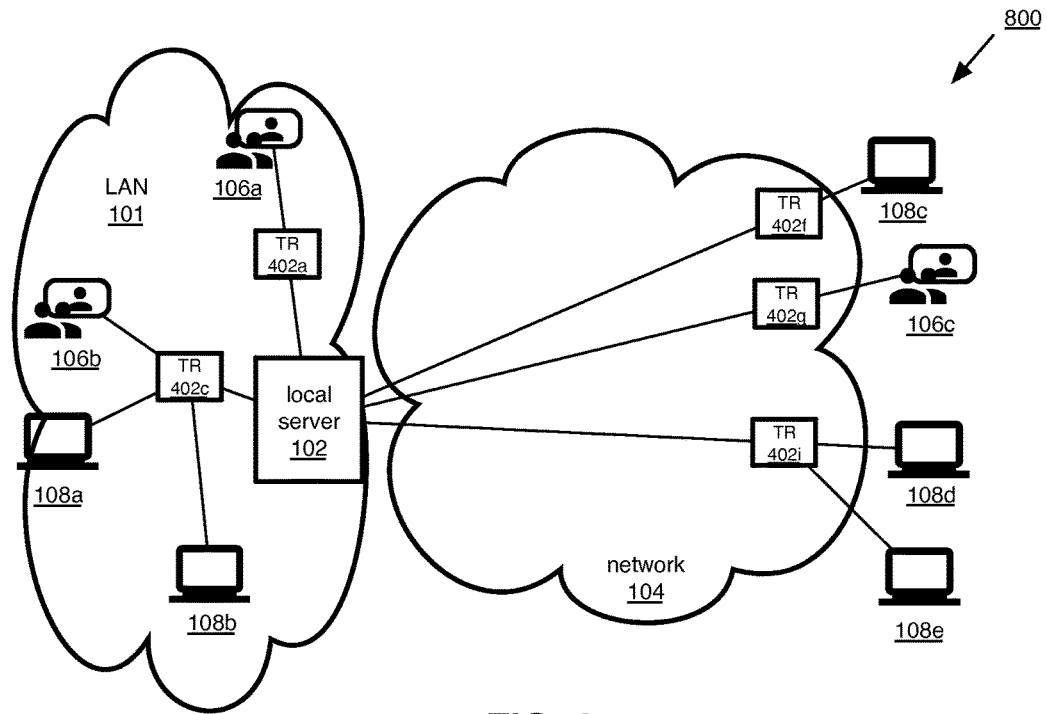
FIG. 8 is a diagram of an exemplary system for providing a teleconferencing service, in accordance with some embodiments of the invention.

FIG. 8 is a diagram of an exemplary system 800 for providing a teleconferencing service, showing an example of how a private network such as the LAN of system 100 may be adapted to include transparent relays 402.

Figure 9:
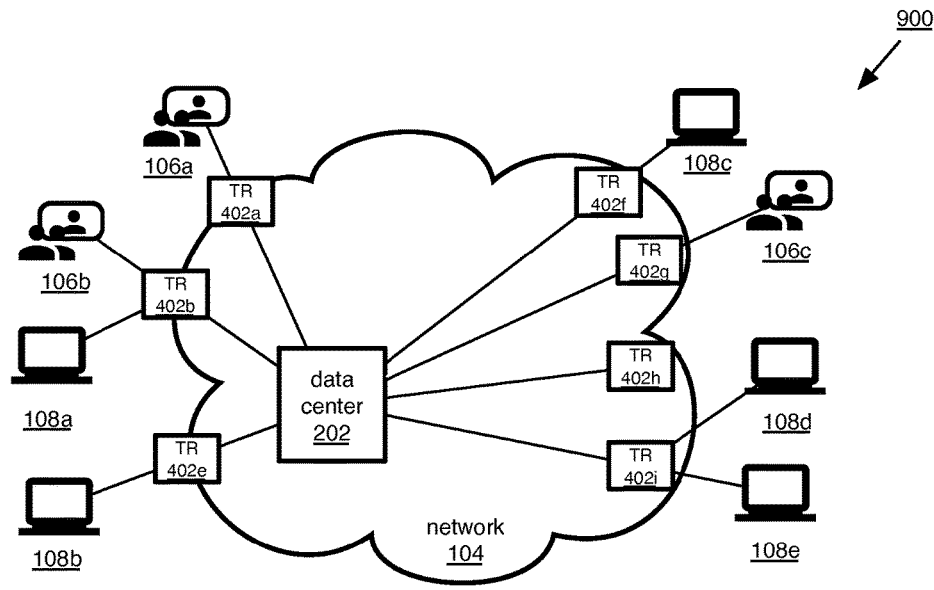
FIG. 9 is a diagram of an exemplary system for providing a teleconferencing service, in accordance with some embodiments of the invention.

FIG. 9 is a diagram of an exemplary system 900 for providing a teleconferencing service, showing an example of how a hosted network such as system 200 may be adapted to include transparent relays 402.

Figure 10:
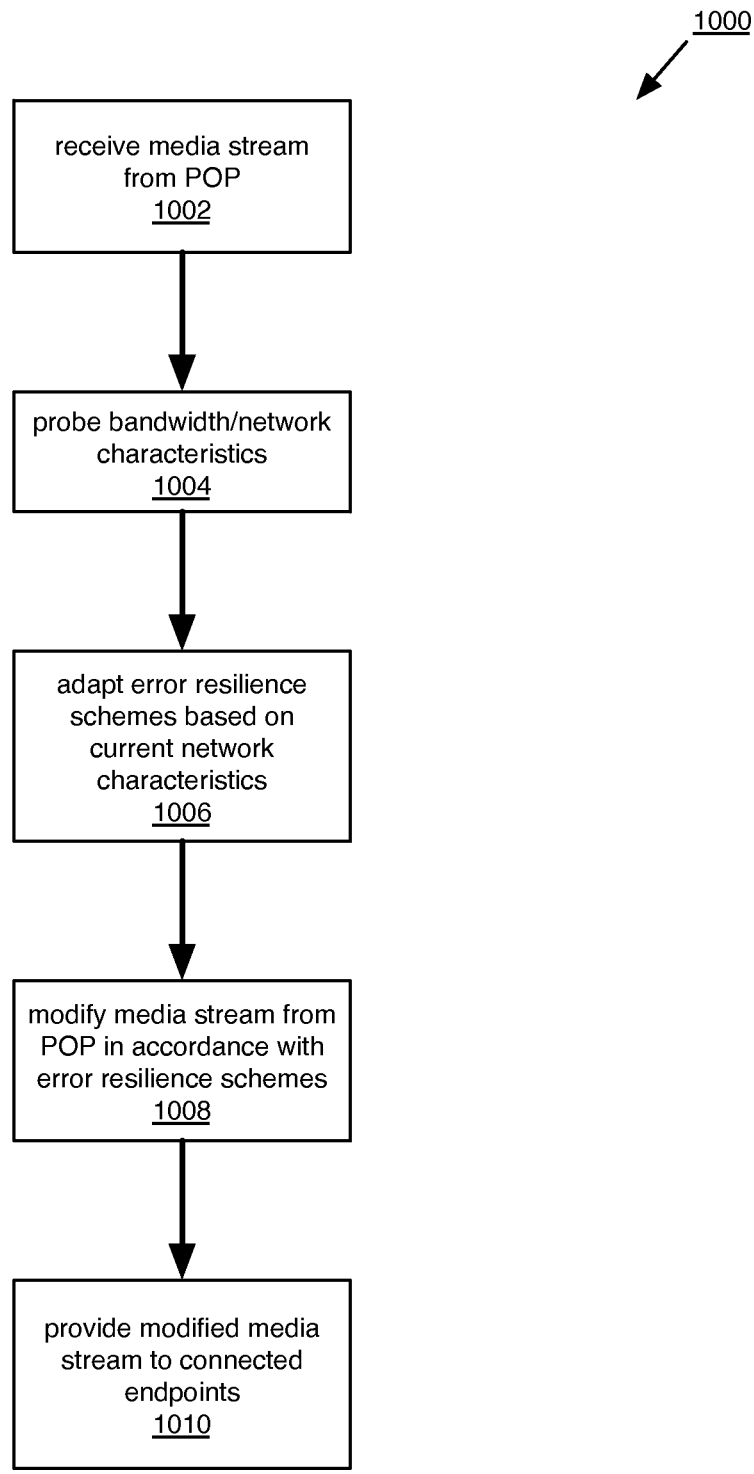
FIG. 10 is a flow chart depicting an exemplary method for providing a teleconferencing service using transparent relays, in accordance with some embodiments of the invention.

FIG. 10 is a flow chart depicting an exemplary approach 1000 for providing a teleconferencing service using transparent relays. A transparent relay 402 may receive a media stream from, for example, a POP, an MCU, or a data center such as data center 202 (1102). Such a stream supports data transfer both to and away from the transparent relay 402. The media data may be video and/or audio data. Before, during, or after receipt of the media stream from the POP, the transparent relay may probe the bandwidth and other network characteristics for the downstream connections between the transparent relay and any connected endpoints to identify whether a connection is associated with, e.g., low or high latency (1004). This assessment of network characteristics may be used by, for example, control component 503 to confirm or modify error resilience schemes in operation for the media stream that is relayed from the transparent relay to connected endpoints 502 (1006). Responsive to any modification to the error resilience schemes, transparent relay 402 may modify the media stream received from the POP to account for the network characteristics for the downstream connections (1008). Meanwhile, transparent relay 402 may be forwarding the media stream received from the POP, and if, for example, control component 503 determined that error correction schemes or modification to same is appropriate, the modified media stream may be provided to one or more connected endpoints (1010).

Below are set out hardware (e.g., machine) and software architectures that may be deployed in the systems described above, in various example embodiments.

Figure 11:
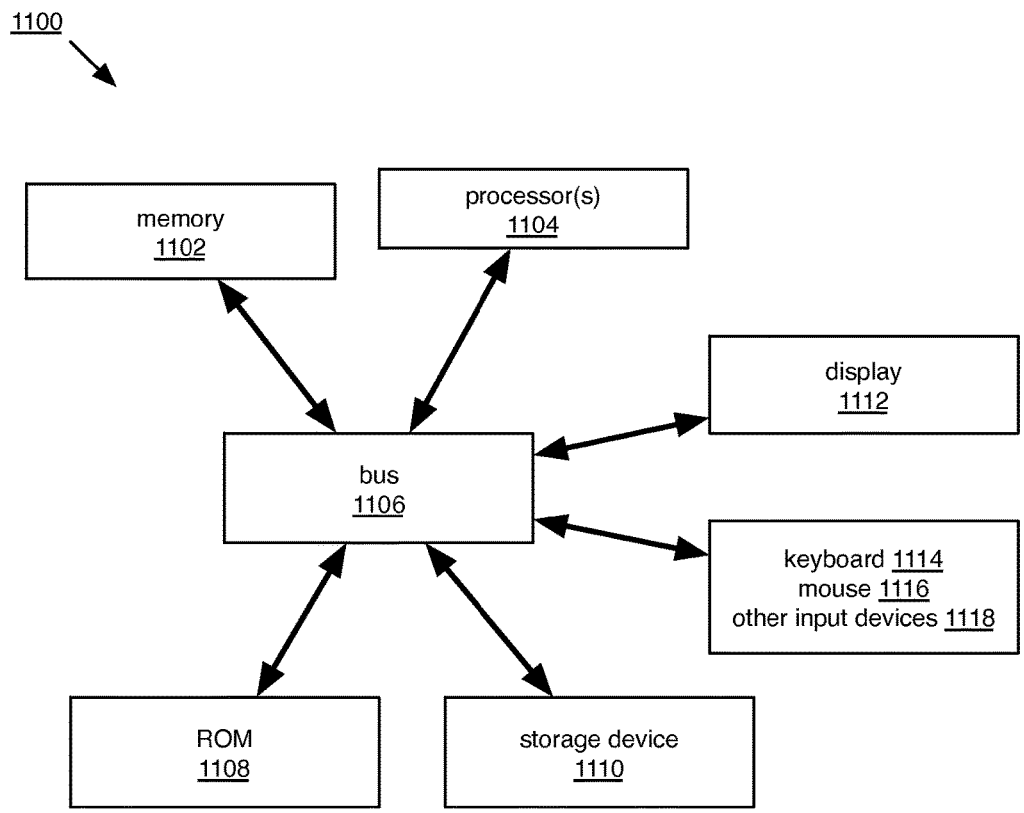
FIG. 11 is a block diagram showing an exemplary computing device, consistent with some embodiments of the invention.

FIG. 11 is a block diagram showing an exemplary computing system 1100 that is representative any of the computer systems or electronic devices discussed herein. Note, not all of the various computer systems have all of the features of system 1100. For example, systems may not include a display inasmuch as the display function may be provided by a client computer communicatively coupled to the computer system or a display function may be unnecessary.

System 1100 includes a bus 1106 or other communication mechanism for communicating information, and a processor 1104 coupled with the bus 1106 for processing information. Computer system 1100 also includes a main memory 1102, such as a random access memory or other dynamic storage device, coupled to the bus 1106 for storing information and instructions to be executed by processor 1104. Main memory 1102 also may be used for storing temporary variables or other intermediate information during execution of instructions to be executed by processor 1104.

System 1100 includes a read only memory 1108 or other static storage device coupled to the bus 1106 for storing static information and instructions for the processor 1104. A storage device 1110, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 1104 can read, is provided and coupled to the bus 1106 for storing information and instructions (e.g., operating systems, applications programs and the like).

Computer system 1100 may be coupled via the bus 1106 to a display 1112 for displaying information to a computer user. An input device such as keyboard 1114, mouse 1116, or other input devices 1118 may be coupled to the bus 1106 for communicating information and command selections to the processor 1104.

The processes referred to herein may be implemented by processor 1104 executing appropriate sequences of computer-readable instructions contained in main memory 1104. Such instructions may be read into main memory 1104 from another computer-readable medium, such as storage device 1110, and execution of the sequences of instructions contained in the main memory 1104 causes the processor 1104 to perform the associated actions. In alternative embodiments, hard-wired circuitry or firmware-controlled processing units (e.g., field programmable gate arrays) may be used in place of or in combination with processor 1104 and its associated computer software instructions to implement the invention. The computer-readable instructions may be rendered in any computer language including, without limitation, Objective C, C#, C/C++, Java, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Figure 12:
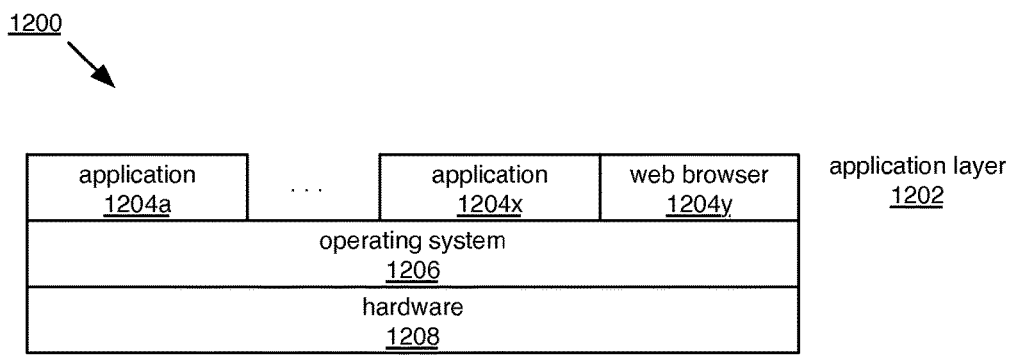
FIG. 12 is a block diagram showing an exemplary computing system, consistent with some embodiments of the invention.

FIG. 12 illustrates a computer system 1200 from the point of view of its software architecture. Computer system 1200 may be any of the electronic devices or, with appropriate applications comprising a software application layer 1202, may be a computer system for use with the publishing tools described herein. The various hardware components of computer system 1200 are represented as a hardware layer 1208. An operating system 1206 abstracts the hardware layer and acts as a host for various applications 1204, that run on computer system 1200. The operating system may host a web browser application 1204y, which may provide access for the user interfaces, etc.

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

What is claimed is:

1. A teleconferencing system comprising:
   a point of presence (POP) situated at a POP location on a network, the POP comprising a media processing node configured to process and composite media streams; and
   a plurality of transparent relays, each respective transparent relay comprising:
   a control component;
   a bandwidth probe component;
   one or more error resilience components;
   a processor and a storage device communicatively coupled to the processor;
   a set of instructions on the storage device that, when executed by the processor, cause the processor to:
   receive a control connection and a first media stream from the POP;
   obtain current network characteristics for a downstream network using a bandwidth probe component, wherein the downstream network comprises a sub-network of the network that connects one or more endpoints to the respective transparent relay, wherein the respective transparent relay is situated at a transparent-relay location that is communicably coupled between the POP location and the one or more endpoints on the network and is geographically closer to the one or more endpoints than the POP location;
   cause the control component to tune the one or more error resilience components in accordance with the current downstream network characteristics to establish a second media stream based on the first media stream; and
   provide the second media stream.

2. The system of claim 1, each respective transparent relay further comprising:
   a stream-shaping component, and wherein the control component tunes the stream shaping component in accordance with the capabilities of the one or more endpoints connected via the downstream network to provide the second media stream, and the second media stream includes less media data than the first media stream.

3. The system of claim 1, wherein the one or more error resilience components are forward error correction (FEC) and retransmission (RTX).

4. The system of claim 1, wherein each respective transparent relay is located in the same geographic region as the one or more endpoints.

5. The system of claim 4, wherein each respective transparent relay is located in the same metropolitan area as the one or more endpoints.

6. The system of claim 1, wherein each respective transparent relay is connected to no more than one endpoint.

7. The system of claim 4, wherein at least one respective transparent relay and at least one endpoint are located at the same business premises.

8. The system of claim 1, wherein the control connection provides access to an encryption key, and the encryption key is not shared with the one or more endpoints.

9. The system of claim 1, wherein the first and second media streams are bidirectional.

10. The system of claim 1, wherein the first media stream is sent using Real-time Transport Protocol (RTP)/RTP Control Protocol (RTCP), and the second media stream is sent using Transmission Control Protocol (TCP) or secure Hypertext Transfer Protocol (HTTPS).

11. A method for providing a teleconferencing service, comprising:
   receiving, at a transparent relay that is not a component of a point of presence (POP), a control connection and a first media stream from the POP, wherein the POP is situated at a POP location on a network;
   obtaining, at the transparent relay, current network characteristics for a downstream network, wherein the downstream network comprises a sub-network of the network that connects one or more endpoints to the transparent relay, wherein the transparent relay is situated at a transparent-relay location that is communicably coupled between the POP location and the one or more endpoints on the network and is geographically closer to the one or more endpoints than the POP location;
   tuning one or more error resilience components in accordance with the current downstream network characteristics to establish a second media stream based on the first media stream; and
   providing the second media stream.

12. The method of claim 11, further comprising:
   at the transparent relay, tuning a stream-shaping component in accordance with the capabilities of the one or more endpoints connected via the downstream network to provide the second media stream, and wherein the second media stream includes less media data than the first media stream.

13. The method of claim 11, wherein the one or more error resilience components are FEC and RTX.

14. The method of claim 11, wherein the transparent relay is located in the same geographic region as the one or more endpoints.

15. The method of claim 14, wherein the transparent relay is located in the same metropolitan area as the one or more endpoints.

16. The method of claim 11, wherein the transparent relay is connected to no more than one endpoint.

17. The method of claim 14, wherein the transparent relay and at least one endpoint of the one or more endpoints are located at the same business premises.

18. The method of claim 11, wherein the control connection provides access to an encryption key, and the encryption key is not shared with the one or more endpoints.

19. The method of claim 11, wherein the first and second media streams are bidirectional.

20. The method of claim 11, wherein the first media stream is sent using RTP/RTCP, and the second media stream is sent using TCP or HTTPS.

\* \* \* \* \*